(12) United States Patent
Siercks et al.

(10) Patent No.: US 9,658,335 B2
(45) Date of Patent: May 23, 2017

(54) MEASUREMENT SYSTEM WITH A MEASURING DEVICE AND A SCANNING MODULE

(71) Applicant: HEXAGON TECHNOLOGY CENTER GMBH, Heerbrugg (CH)

(72) Inventors: Knut Siercks, Mörschwil (CH); Bernhard Metzler, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 381 days.

(21) Appl. No.: 14/375,423

(22) PCT Filed: Jan. 30, 2013

(86) PCT No.: PCT/EP2013/051806
§ 371 (c)(1),
(2) Date: Jul. 29, 2014

(87) PCT Pub. No.: WO2013/113759
PCT Pub. Date: Aug. 8, 2013

(65) Prior Publication Data
US 2015/0042977 A1   Feb. 12, 2015

(30) Foreign Application Priority Data
Jan. 30, 2012   (EP) .................................... 12153162

(51) Int. Cl.
*G01C 3/08*   (2006.01)
*G01S 17/89*   (2006.01)
(Continued)

(52) U.S. Cl.
CPC ................ *G01S 17/89* (2013.01); *G01C 1/02* (2013.01); *G01C 15/002* (2013.01); *G01C 15/006* (2013.01); *G01S 7/4817* (2013.01)

(58) Field of Classification Search
CPC ...... G01C 15/002; G01C 15/006; G01C 1/02; G01S 7/4817; G01S 17/89
(Continued)

(56) References Cited

U.S. PATENT DOCUMENTS 5,886,340 A   3/1999   Suzuki et al.
6,072,642 A   6/2000   Shirai
(Continued)

FOREIGN PATENT DOCUMENTS

DE   196 23 060 C1   7/1997
DE   197 10 722 A1   10/1997
(Continued)

OTHER PUBLICATIONS

European Search Report dated Jul. 16, 2012 as received in Application No. 12153162.8.

*Primary Examiner* — Mark Hellner
(74) *Attorney, Agent, or Firm* — Maschoff Brennan

(57) ABSTRACT

The present invention relates to a measurement system 50 having a measuring device 20 and a scanning module 10 which has: a fastening means for fastening the scanning module 10 onto a holder; a beam deflection element 11 that is rotatable by a motor about an axis of rotation 12 to deflect a scanning laser beam 60, wherein the axis of rotation 12 is arranged at a defined angle relative to the pivoting axis 22; and a second angle measurement functionality 13 for determining an angle of rotation from an angle position of the beam deflection element 11. In addition, the measuring device 20 has a holder designed such that the scanning module 10 can be fastened by means of the fastening means in a module-like manner in a defined position on the measuring device 20.

19 Claims, 7 Drawing Sheets

(51) Int. Cl.
*G01C 15/00* (2006.01)
*G01S 7/481* (2006.01)
*G01C 1/02* (2006.01)

(58) Field of Classification Search
USPC ........................................................ 356/4.01
See application file for complete search history.

(56) References Cited

U.S. PATENT DOCUMENTS

| | | | |
|---|---|---|---|
| 6,433,858 B1 | 8/2002 | Suzuki | |
| 6,512,993 B2 * | 1/2003 | Kacyra | G01B 11/002 356/317 |
| 7,342,650 B2 | 3/2008 | Kern et al. | |
| 7,583,373 B2 | 9/2009 | Schwarz | |
| 8,379,191 B2 | 2/2013 | Braunecker et al. | |
| 8,699,756 B2 | 4/2014 | Jensen | |
| 2002/0093646 A1 | 7/2002 | Muraoka et al. | |
| 2003/0009891 A1 | 1/2003 | Ohtomo et al. | |
| 2008/0075326 A1 * | 3/2008 | Otani | G01C 3/00 382/106 |
| 2010/0133403 A1 | 6/2010 | Parham | |

FOREIGN PATENT DOCUMENTS

| | | |
|---|---|---|
| DE | 199 26 706 A1 | 12/1999 |
| DE | 199 49 580 B4 | 3/2007 |
| EP | 0 797 072 A2 | 9/1997 |
| EP | 1 686 350 A1 | 8/2006 |
| EP | 1 906 141 A2 | 4/2008 |
| EP | 2 208 964 A1 | 7/2010 |
| EP | 2 219 011 A1 | 8/2010 |
| EP | 2 141 450 B1 | 4/2011 |
| EP | 1 759 172 B1 | 6/2011 |
| WO | 97/40342 A2 | 10/1997 |
| WO | 2004/036145 A1 | 4/2004 |
| WO | 2010/108642 A1 | 9/2010 |

* cited by examiner

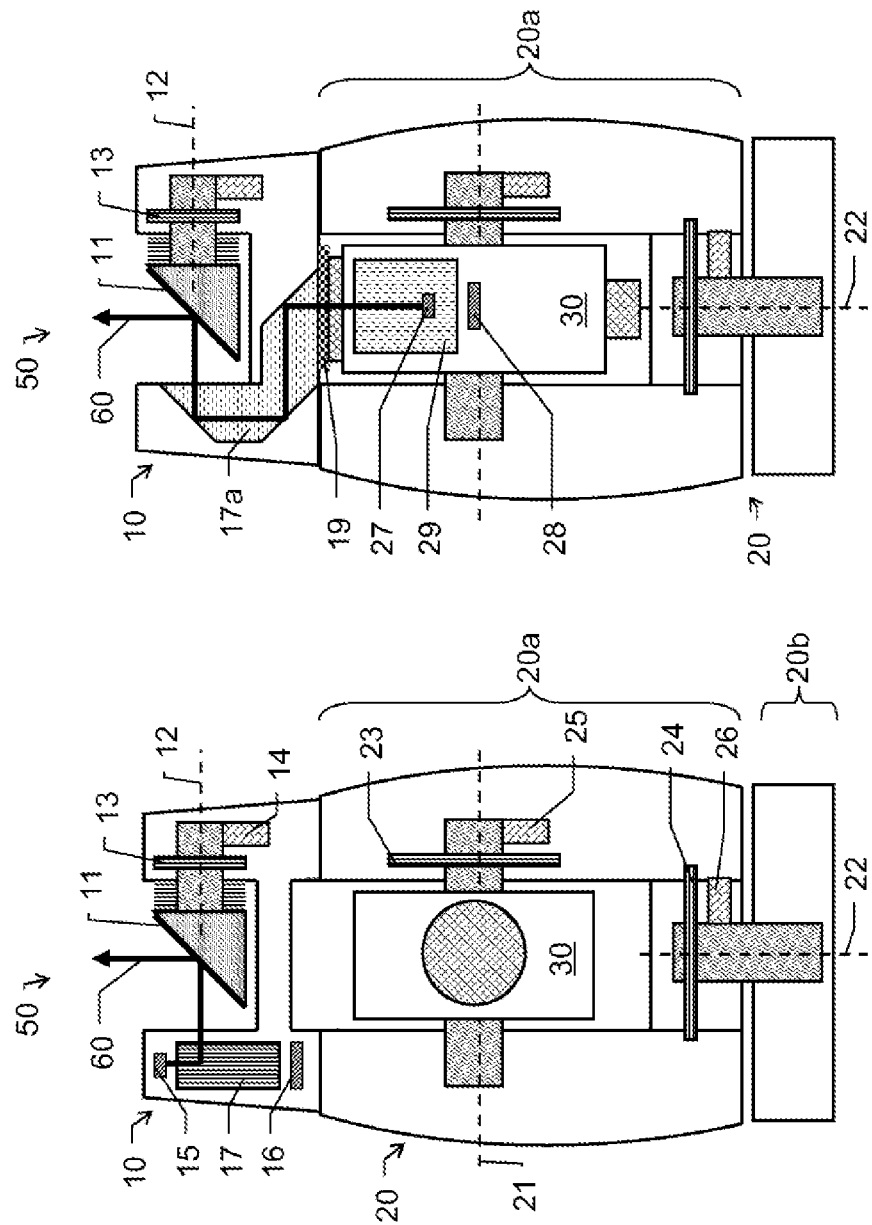

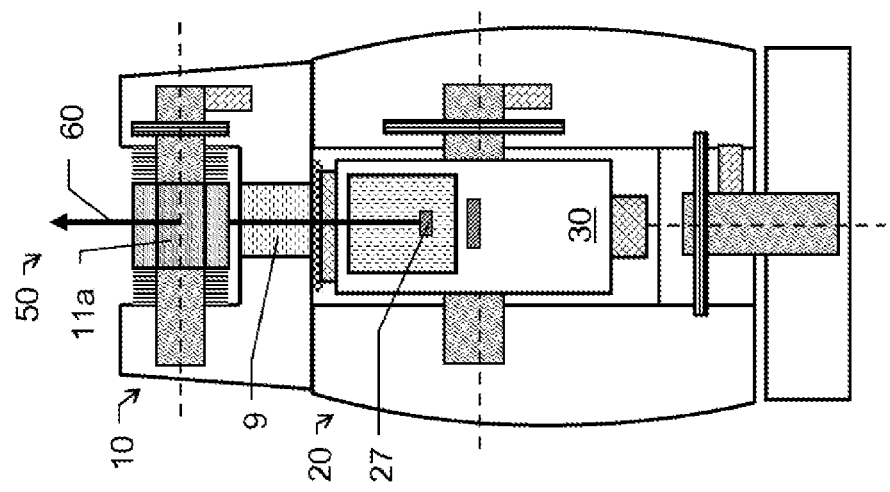
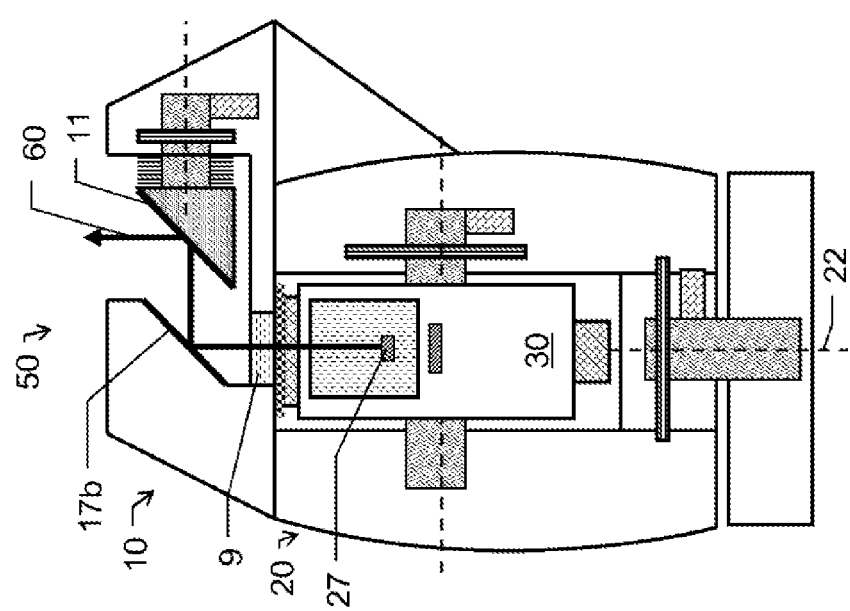

MEASUREMENT SYSTEM WITH A MEASURING DEVICE AND A SCANNING MODULE

FIELD OF THE INVENTION

The invention relates to a measurement system with a measuring device and a scanning module.

BACKGROUND

For acquiring objects or surfaces, use is often made of methods which progressively scan and in the process capture the topography of a structure, such as of a building, for example. In this case, such a topography constitutes a continuous sequence of points which describes the surface of the object, or else a corresponding model or a description of the surface. One conventional approach is scanning by means of a laser scanner which in each case acquires the spatial position of a surface point by the distance to the targeted surface point being measured by means of the laser and this measurement being combined with the angle information of the laser emission. From this distance and angle information, the spatial position of the acquired point can be determined and the surface can be continuously measured. In many cases, in parallel with this purely geometrical acquisition of the surface, image capture by means of a camera is also carried out, which, besides the overall visual view, also provides further information, e.g. regarding the surface texture.

In this regard, WO 97/40342, for example, describes a method which captures a topography by means of scanner systems installed in a stationary manner. A fixed installation point is chosen for these systems and serves as a basis for a scanning process brought about by motors. The three-dimensional location information of the respective surface point can be derived via the distance to the measured point, the angular position at the time of the measurement and the known location of the scanning apparatus. In this case, the scanner systems are specifically designed for the task of topography acquisition and scan a surface by movement of the scanner system or by variation of the beam path.

Moreover, scanning functions can be integrated into various other devices as additional functions. WO 2004/036145 discloses, for example, a geodetic measuring device which emits a laser beam for distance measurement from its position within the acquired range. Such measuring devices can likewise be modified for acquiring surfaces in a scanning fashion, or be operated without modification. One example thereof is motorized theodolites or total stations.

Other methods use mobile systems which scan a structure to be acquired by means of a movement of the scanner system, or support or supplement the scanning. Such systems are particularly suitable for acquiring linear or linearly navigable structures such as, for example, track systems, roads, tunnel systems or airfields.

Such acquisition processes in the prior art provide images or topographical data which substantially represent the information about the spatial distribution or arrangement relationship of surface points. If appropriate, additionally captured images allow further information to be derived. The structure and the course of the surface can thus be reconstructed comparatively well. What is disadvantageous, however, is the lack of qualitative indications about the type and constitution of the surface, in particular with regard to the internal structure or composition. In this regard, images captured in parallel with the scanning usually allow the identification of different brightness values. Furthermore, EP 1 759 172 describes a scanner system and a method for acquiring surfaces in spectrally resolved form which provides for deriving surface properties from the information obtained thereby.

Such laser scanners according to the prior art enable a user to acquire large surfaces and objects with a relatively short time expenditure—depending on a desired point-to-point resolution—completely and, if appropriate, with additional object information, but the accuracy of the point coordinates which can be derived in this case does not satisfy the high geodetic accuracy standards as established for example for modern measuring devices, in particular for total stations or theodolites.

Modern total stations generally have a compact and integrated design, wherein coaxial distance measuring elements and also computing, control and storage units are usually present in a device. Depending on the expansion stage of the total station, motorization of the targeting or sighting device and—in the case of the use of retroreflectors (for instance an all-round prism) as target objects—means for automatic target seeking and tracking can additionally be integrated. As a human-machine interface, the total station can have an electronic display control unit—generally a microprocessor computing unit with electronic data storage means—with display and input means, e.g. a keyboard. The measurement data acquired in an electrical-sensor-based manner are fed to the display control unit, such that the position of the target point can be determined, optically displayed and stored by the display control unit. Total stations known from the prior art can furthermore have a radio data interface for setting up a radio link to external peripheral components such as e.g. a handheld data acquisition device, which can be designed, in particular, as a data logger or field computer.

For sighting or targeting the target point to be measured, geodetic measuring devices of the generic type have a telescopic sight, such as e.g. an optical telescope, as sighting device. The telescopic sight is generally rotatable about a vertical axis and about a horizontal tilting axis relative to a base of the measuring device, such that the telescopic sight can be aligned with the point to be measured by pivoting and tilting. Modern devices can have, in addition to the optical viewing channel, a camera for sighting with angular seconds accuracy, said camera being integrated into the telescopic sight and being aligned for example coaxially or in a parallel fashion. The images or image sequences that can be acquired in this case, in particular a live image, can be represented on the display of the display control unit and/or on a display of the peripheral device—such as e.g. the data logger—used for remote control. In this case, the optical system of the sighting device can have a manual focus—for example an adjusting screw for altering the position of a focusing optical system—or an autofocus, wherein the focus position is altered e.g. by servomotors. By way of example, such a sighting device of a geodetic measuring device is described in EP 2 219 011. Automatic focusing devices for telescopic sights of geodetic devices are known e.g. from DE 197 107 22, DE 199 267 06 or DE 199 495 80.

Since target objects (e.g. the plumb rods with target mark, such as an all-round prism, which are usually used for geodetic purposes) cannot be targeted sufficiently precisely with the naked eye on the basis of the sighting device despite the 30-fold optical magnification often provided (i.e. not conforming to geodetic accuracy requirements), conventional measuring devices in the meantime have as standard an automatic target tracking function for prisms serving as target reflector (ATR: "Automatic Target Recognition"). For this, a further separate ATR light source—e.g. a multimode fiber output, which emits optical radiation having a wavelength in the range of 850 nm—and a specific ATR detector (e.g. CCD or CMOS area sensor) sensitive to said wavelength are conventionally additionally integrated in the telescope. By way of example, EP 2 141 450 describes a measuring device having a function for automatically targeting a retroreflective target and having an automatic target tracking functionality.

With such modern measuring devices, the coordinates of appropriate target points can be determined with a very high geodetic precision. What is disadvantageous in this case, however, is that a large-area object measurement e.g. with a total station means a disproportionately high time expenditure compared with a measuring process of a laser scanner on the object.

SUMMARY

Therefore, a problem addressed by the invention is that of providing an additional device which, in interaction with a basic device, enables faster and improved point-by-point acquisition of a surface.

A further problem addressed by the invention is that of providing an improved measuring instrument which, besides an instrument-inherent highly precise target point determining possibility, enables a functionality for rapidly acquiring a multiplicity of target points with—relative to multiple precise target point determination—short time expenditure.

A further problem addressed by the invention is that of extending a measuring device according to the prior art in such a way that a scanning functionality is additionally provided for the measuring device.

A measurement system according to the invention comprises a measuring device, in particular total station, theodolite or laser tracker, comprising a base, a construction arranged on the base and pivotable about a pivoting axis, and a targeting unit, in particular telescopic sight, wherein the targeting unit has at least an emission unit for emitting a first laser beam, said emission unit defining an optical target axis, and a first distance measuring functionality for measuring a distance to an object. In addition, the measuring device has a first angle measuring functionality for highly precisely acquiring at least one pivoting angle defined by a relative pivoting position of the construction with respect to the base. The measurement system additionally comprises a control and processing unit for data processing and for control of the measurement system.

Furthermore, the measurement system has a scanning module comprising fixing means for fixing the scanning module to a receptacle corresponding to the fixing means, comprising a beam deflection element for deflecting a scanning laser beam, said beam deflection element being rotatable about a rotation axis in a motorized fashion, wherein the rotation axis in a received state is at a defined angle relative to the pivoting axis, in particular orthogonally, and comprising a second angle measuring functionality for determining a rotation angle from an angular position of the beam deflection element. The measuring device furthermore has a receptacle embodied in such a way that the scanning module can be fixed in a modular manner in a defined positioning on the measuring device as a result of an interaction of the receptacle with the fixing means. Furthermore, the control and processing unit is embodied in such a way that the respective rotation angle, the respective pivoting angle and the respective distance for a point on the object are combined, such that a respective point position is defined by the combination, and a point cloud having a number of the point positions can be generated.

With such a measurement system, by means of the rotating movement of the deflection element, for example of a mirror, and the deflection of the scanning laser beam impinging thereon, it is possible to define a laser plane or a laser area, in particular of higher order. By virtue of the fact that the scanning module, in which the mirror rotates, is pivoted about a second axis by means of the measuring device, serving as a pivoting apparatus, the laser plane can now be offset continuously and an environment can thus be scanned continuously by means of the emitted laser beam. In addition, for each point on which the laser beam impinges, is reflected and is detected by a detector for the purpose of distance measurement, an emission direction of the laser beam firstly relative to the scanning module and secondly relative to the base of the measuring device is determined by means of the two goniometers. In this case, the distance measurement can be carried out e.g. according to the phase measuring principle or by means of a time-of-flight determination. By means of the combination of measured angle and respective distance variables respectively associated with a point, which combination is performed by means of the control and processing unit, it is possible to generate value arrays, wherein each array represents a coordinate of the measured point. By way of example, it is possible to combine distances and angles acquired simultaneously or within a specific time period or at defined time intervals. A point cloud which embodies the measured environment can furthermore be generated by joining together a multiplicity of such value arrays. According to the invention, the scanning module is designed in such a way that it can be detached from the pivoting unit or can be placed thereon in a modular manner by means of fixing means specifically provided for this purpose. In this case, by way of example, a stand comprising a base, which is fixedly connected to a tripod, and a construction fitted on the base and pivotable relative thereto can serve as a pivoting apparatus for the measurement system according to the invention. In addition, receptacles can be arranged on such an apparatus, which receptacles are respectively suitable for receiving the scanning module, such that a defined connection between the components arises which is releasable again in a simple manner. A receptacle suitable for this purpose and corresponding fixing means can interact and be designed in principle according to a plug-socket principle.

In particular, according to the invention, it is possible that the scanning module has a beam passage unit, and the targeting unit can be aligned in such a way that the first laser beam can be coupled into the scanning module by means of the beam passage unit in a coupling-in state and can be deflected in a rotating fashion as a scanning laser beam about the rotation axis by means of the beam deflection element, in particular wherein a scanning laser beam reflected at the object can be coupled out from the scanning module by means of the beam passage unit.

According to the invention, the scanning module of the measurement system can additionally have an acquisition unit embodied in such a way that an impingement position of the first laser beam, which can be deflected onto the acquisition unit by means of the beam deflection element in the coupling-in state, on the acquisition unit can be acquired, wherein a positioning parameter indicating a relative positioning of the scanning module with respect to the measuring device can be generated depending on the impingement position, in particular wherein the point positions can be corrected by means of the positioning parameter.

In the arrangement of the scanning module on the measuring device, wherein the fixing means of the scanning module are releasably connected to the receptacles of the measuring device, the first laser beam, which can be emitted by means of the targeting unit, can be aligned by a defined alignment of the targeting unit in such a way that the beam is directed onto the beam passage unit and is transmitted or coupled into the scanning module by said beam passage unit. For this purpose, the beam passage unit can be embodied e.g. with a specific optically transparent material, such that in each case that radiation of the emission unit of the measuring device having a specific wavelength is transmitted through the material. The laser radiation is then guided, for example by means of mirrors, prisms and/or lenses, to the beam deflection element, where it is deflected at a specific angle and emitted from the scanning module. By means of the rotation of the beam deflection element (and by means of the simultaneous pivoting of the measuring device) and the emission, the reflection at an object and the reception of the beam, the object can be scanned in this way. The reflected beam can thus be coupled out from the scanning module in a manner corresponding to an emission beam path and can be coupled into the measuring device and thus received again at the measuring device, and the distance to the object can thus be measured by means of the distance measuring functionality of the targeting unit.

According to the invention, as a result of the acquisition of the laser beam emitted by the measuring device by means of a specific acquisition unit on the part of the scanning module, e.g. by means of an area sensor (e.g. CMOS or CCD array), it is additionally possible to determine parameters with which a determination of the positioning of the scanning module on the measuring device can be performed. By way of example, from a deviation of the impinging laser beam from an image center of the acquisition unit—depending on the direction and distance from the center—it is possible to obtain information regarding the position and orientation of the scanning module relative to the measuring device. The parameters determined in this case or the measurement signals generated can be made available to the control and processing unit for determining e.g. correction parameters. The latter in turn can additionally be used for possible compensation of measurement values or can be displayed to a user graphically, e.g. on a display, such that said user can perform a position correction of the two components (measuring device and scanning module) relative to one another.

Furthermore, according to the invention, it is possible that the scanning module has a beam source for emitting a second laser beam as a scanning laser beam, and the scanning laser beam can be deflected in a rotating fashion about the rotation axis by means of the beam deflection element, in particular wherein the scanning module has a second distance measuring functionality for distance measurement, in particular by means of the scanning laser beam.

By virtue of the arrangement of this beam source, e.g. in the scanning module, the laser beam for scanning an object can be emitted independently of the measuring device and coupling of the beam into the scanning module need not be performed in order to provide the scanning functionality. The scanning module can additionally have a further distance measuring functionality and a distance to the object can be measurable as a result of a reception of the reflected scanning beam at the scanning module. In this configuration, therefore, both the rotation angle and the distance can be determined on the part of the scanning module. The pivoting angle can be determined by means of the measuring device.

In general, the pivoting angle can be communicated to a control and processing unit assigned to the scanning module and the combination, further processing and/or provision of pivoting angle, rotation angle and distance can be effected there. In particular, rotation angle and distance can be transmitted to a control and processing unit assigned to the measuring device and can be combined and provided on the part of the measuring device. Furthermore, the data for combination, processing and/or provision can be made available to a mobile or stationary unit, e.g. working computer, laptop or remote control for the system, with control and processing unit. The data transmission can furthermore take place in a cable-based manner, by means of radio, WLAN, infrared or via Bluetooth.

In particular, the measurement system can have at least one distance measuring sensor for measuring a distance between the scanning module and the measuring device in the received state for generating a further positioning parameter indicating the relative positioning of the scanning module with respect to the measuring device.

Such a sensor makes it possible to precisely determine a relative position of the scanning module on the measuring device, particularly if three such sensors—not lying on a straight line—are provided for this position determination. In this regard, distances between the components can be measured and a relative inclination of the components with respect to one another can be determined, for example, from the distances being related to one another. Accordingly, if the position and alignment of the measuring device are known, the alignment and—in the case of a defined positioning of the scanning module on the measuring device—if appropriate the position of the scanning module can be determined unambiguously by means of the sensors. From these measurements, information concerning the position and alignment can be provided to the system e.g. in a defined parameter form and can be processed further for example for purposes of compensation or adaptation of coordinates to be determined, in particular on the part of the control and processing unit.

In addition, according to the invention, it is possible that the measurement system has an at least two-component centering apparatus for the defined positioning of the scanning module on the measuring device, wherein a first component is assigned to the scanning module and a second component is assigned to the measuring device, in particular wherein a positioning accuracy can be measured by means of sensors for determining a relative positioning of the first component with respect to the second component.

In order to be able to fix the scanning module in a defined position and alignment on the measuring device or—in general—on a pivoting apparatus having a construction pivotable relative to a base, such a centering apparatus can be integrated into the measurement system or arranged thereon. As a result of an interaction of the first component of said centering apparatus with the second component, wherein respectively one of the components is assigned to the scanning module and the other is assigned to the measuring device or the pivoting apparatus, a high mounting precision can be achieved when the scanning module is mounted on the measuring device. In addition, it is possible to provide sensors with which distances between the centering components and thus a centering accuracy can be determined. Such a centering apparatus can consist, for example, of a pin as first component and a receptacle as second component, which is configured for precisely receiving the pin, in particular with a defined tolerance being complied with. At the sides of the pin receptacle which face the pin in a centering state, it is additionally possible to arrange sensors for distance measurement with respect to the pin. One known, releasable precision connection with forced centering free of play is known as an interface to the tripod on the lower part of the theodolite. The connection of the scanning module to the measuring device can be embodied in a comparable manner.

In addition, according to the invention, the measurement system can have a camera for acquiring an image. An image of the environment to be measured or of the object can be captured by means of said camera, wherein information acquired in the image can be used for characterizing the object or the surface thereof. By means of a combination of the image information with the measurement data generated in the scanning process, additional object properties can, in particular in a punctiform manner, be resolved, derived and processed further. Moreover, the camera can be arranged in the measurement system and embodied in such a way that the image is acquired by means of the beam deflection element, that is to say that incident light can be directed onto the camera with the aid of the beam deflection element. Furthermore, the beam deflection element can be embodied by a mirror, in particular by a polygon mirror. The deflection of the laser beam can thus be effected depending on the configuration of the mirror and its relative inclination with respect to a direction of incidence of the laser beam at a defined angle. Furthermore, the laser beam can thereby be deflected repeatedly within a complete revolution of the polygon mirror.

According to the invention, it is additionally possible that an inclination or tilting of the scanning module relative to the measuring device can be determined by means of a scanning of a prominent structure (by means of the scanning module and the measuring device), wherein the relative inclination is determined depending on a comparison of a scanning point cloud representing the prominent structure and generated by means of the scanning module and a measurement point cloud representing the prominent structure and generated by means of the measuring device.

The invention furthermore relates to a scanning module according to the invention for a measurement system according to the invention comprising a beam deflection element for deflecting a scanning laser beam, said beam deflection element being rotatable about a rotation axis in a motorized fashion, and an angle measuring functionality for determining a rotation angle from an angular position of the beam deflection element. Furthermore, the scanning module has fixing means for fixing the scanning module to a receptacle corresponding to the fixing means, wherein the scanning module can be fixed in a modular manner in a defined positioning on the measuring device as a result of an interaction of the fixing means with the receptacle arranged on a measuring device, in particular total station, theodolite or laser tracker. In addition, the scanning module is designed for transferring the rotation angle to a control and processing unit in accordance with the measurement system according to the invention.

Such a scanning module or such an attachment scanner can generate a laser plane as a result of the rotation of the laser beam about the rotation axis, wherein both the emitted laser beam and a beam reflected at an object can be guided by means of the beam deflection element or be directed in accordance with a specific measurement direction from the beam source to the object and from the object to the detector. The respective emission and reception directions of the beam can furthermore be determined by means of an incorporated angle measuring sensor. If distances to points are then measured by means of the laser beam and these distances are combined with the angles present at the time of measurement, a coordinate of the respective target point can be determined from each distance-angle combination and the point cloud can be generated by means of an accumulation or cumulation of these points. Furthermore, the scanning module with the fixing means can be positioned and fixed on an apparatus, in particular by means of a receptacle apparatus provided for this purpose. By means of this apparatus, the scanning module can be pivoted or rotated about a second axis, which is perpendicular to the rotation axis of the beam deflection element, wherein the laser plane is thus correspondingly pivoted and a generation of a point cloud of a measurement environment traversed by pivoting or of an object pivoted away can thus be carried out. The data, in particular rotation angles, generated on the part of the scanning module in this case can be made available to the control and processing unit, e.g. of a total station, for combining rotation angles with pivoting angles and distances.

Furthermore, according to the invention, the scanning module can have a beam passage unit for coupling in and/or coupling out the scanning laser beam, such that at least the coupled-in scanning laser beam can be deflected in a rotating manner about the rotation axis by means of the beam deflection element. As a result, a laser beam from a beam source physically separated from the scanning module can be radiated into the scanning module and guided in such a way that the beam can be used as a scanning laser beam and can be deflected by means of the beam deflection element. The distance measurement with respect to the object can in this case likewise be effected with the aid of the coupled-in laser beam. For this purpose, the beam reflected at the object can in turn be received on the part of the scanning module, deflected by the beam deflection element and coupled out by the beam passage unit, which is embodied for example with optically transparent material, such that the coupled-out beam is acquired by a detector for the purpose of the distance measurement.

In particular, according to the invention, it is possible that the scanning module has an acquisition unit for acquiring the scanning laser beam, wherein the acquisition unit has a distance measuring functionality for measuring distance with respect to an object and/or a position-sensitive sensor for determining an impingement position of the scanning laser beam on a sensor. Moreover, according to the invention, it is possible that the scanning module has a beam source for emitting the scanning laser beam, and the scanning laser beam can be deflected in a rotating manner about the rotation axis by means of the beam deflection element. With these embodiments of the scanning module, firstly, the beam can be emitted independently of external beam sources and secondly, the distance measurement can likewise be determined independently of additional distance measuring devices. In a combination of these embodiments, both the rotation angles and the distances for points on the object can be determined by means of the scanning module. In this case, the beam source can emit a laser beam in such a way that the latter impinges on the beam deflection element so as to be deflected there onto the object. Furthermore, further beam guiding means can be provided, which guide the emitted beam in such a way that the latter impinges on the beam deflection element and, if appropriate, the reflected laser beam is guided toward the detector. In this case, the laser beam source can emit, for example, a largely collimated laser beam or a divergent beam expanded in a defined manner.

The scanning module according to the invention can furthermore have a data interface embodied in such a way that information, in particular angle information and/or distance information, can be transmitted from the scanning module to a device, in particular measuring device, connected to the scanning module by means of the fixing means, in particular wherein the information can be transmitted between scanning module and device. By means of such a data interface, the rotation angles determined by the scanning module can be transmitted for example to the processing unit of a measuring device and can be combined there with pivoting angle and distance information for respective points. Coordinates for the respective point can in each case be generated by means of such a combination. Furthermore, the data transfer can take place in the opposite direction, from the measuring device to the scanning module, and the processing of the information can be carried out with a corresponding control and processing unit on the part of the scanning module.

According to the invention, it is possible that the scanning module has a control and processing unit for data processing and for controlling the alignment of the beam deflection element, wherein the control and processing unit is designed in such a way that, after obtaining pivoting angle information generated by the measuring device and in particular distance information indicating the distance to an object, the respective rotation angle, the respective pivoting angle and the respective distance for a point on the object are combined, such that a respective point position on the object is defined by the combination. In addition, it is possible that a point cloud having a number of the point positions can be generated.

In particular, the scanning module according to the invention can have an inclination sensor and/or a camera for acquiring an image. By means of the inclination sensor, a positioning of the scanning module can thus be determined, in particular independently of a positioning and alignment of a measuring device, and the scanning module can be brought to a defined position. By way of example, a leveling of the module can be set or checked by means of a spirit level or a compensation or correction of acquired point coordinates can be effected by means of an electronic inclinometer. With an additionally arranged camera, it is furthermore possible, for example, to acquire images of those surroundings which are acquired by the scanning module or by the pivoting of the laser plane. In this case, panoramic images representing the complete measurement environment can be generated by joining together a plurality of images. Furthermore, image information can be combined with generated data of the scanning module and additional surface information, e.g. color, contours or reflection behavior, of measured objects can thus be generated.

The invention additionally relates to a measuring device, in particular total station, theodolite or laser tracker, for a measurement system according to the invention, comprising a base, a construction arranged on the base and pivotable about a pivoting axis, and a targeting unit, in particular telescopic sight, wherein the targeting unit has at least an emission unit for emitting a laser beam, said emission unit defining an optical target axis, and a distance measuring functionality for measuring a first distance to an object. In addition, provision is made of an angle measuring functionality for highly precisely acquiring at least one pivoting angle defined by a relative pivoting position of the construction with respect to the base.

The measuring device furthermore has a receptacle embodied in such a way that a scanning module can be fixed in a modular manner in a defined positioning on the measuring device as a result of an interaction of the receptacle with fixing means of the scanning module. Furthermore, provision is made of a data interface embodied in such a way that information, in particular angle information and/or distance information, can be obtained, in particular from the scanning module, and a control and processing unit for data processing and for controlling the measuring device, wherein the control and processing unit is embodied in such a way that, after obtaining rotation angle information generated by the scanning module and in particular distance information indicating a second distance to the object, the respective rotation angle, the respective pivoting angle and the respective first or second distance for a point on the object are combined, such that a respective point position on the object is defined by the combination. It is possible that a point cloud having a number of the point positions can additionally be generated.

With a measuring device according to the invention, by means of a combination with a scanning module according to the invention, it is possible to produce a system which inherently unites both the advantages e.g. of a laser scanner, in particular with regard to the measurement speed advantages, and the advantages e.g. of a total station, in particular with regard to the measurement accuracy. By means of the measuring device, for example, a target point can be measured highly precisely and its coordinates can be determined exactly. However, if e.g. a rapid overview scan of an environment is required for orientation, coarse targeting or creation of a terrain model, on account of a significantly higher measurement speed, a scanning module fitted on the measuring device can be pivoted by means of drives for the alignment of the targeting unit and a rapid scan of an environment can thus be carried out. The measuring device can thus form a system component of the measurement system with which a scanning module can be combined and which is designed for pivoting the scanning module. For this purpose, receptacles corresponding to fixing means of the scanning module can be provided for fixing.

A further aspect of the invention relates to a scanning method for generating a point cloud comprising
  emitting a scanning laser beam,
  rotationally deflecting the scanning laser beam about a rotation axis,
  pivoting the scanning laser beam about a pivoting axis situated at a defined angle, in particular perpendicularly, with respect to the rotation axis,
  receiving the scanning laser beam after reflection at an object,
  measuring the distance to the object and respectively determining rotation and pivoting angles,
  combining the respective rotation angle, the respective pivoting angle and the respective distance for a point on the object, such that a respective point position on the object is defined by the combination, and
  generating a point cloud having a number of the point positions.

In this case, at least rotationally deflecting the scanning laser beam is effected by means of a scanning module according to the invention. In particular, according to the invention, at least pivoting the scanning laser beam can be effected by means of a measuring device according to the invention.

In particular, a synchronization signal can be exchanged in order to control or coordinate a respective combination of the measurement values (e.g. rotation angles, pivoting angle, distance for a point on the object) of the sensors.

The invention furthermore provides a computer program product comprising program code, stored on a machine-readable carrier, for controlling or carrying out the scanning method according to the invention for generating a point cloud, in particular if the program is executed on an electronic data processing unit embodied as a control and processing unit of a measurement system according to the invention.

BRIEF DESCRIPTION OF THE DRAWINGS

The method according to the invention, the measurement system according to the invention, the scanning module and measuring device according to the invention are described in greater detail purely by way of example below on the basis of specific exemplary embodiments illustrated schematically in the drawings, further advantages of the invention also being discussed. In detail:

FIGS. 2a-d in each case show a measurement system according to the invention with a measuring device and a scanning module fixed thereto;

DETAILED DESCRIPTION

Figure 1A:
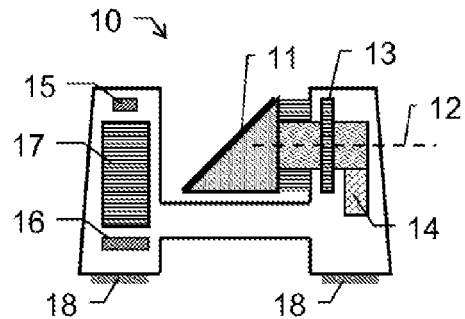
FIGS. 1a-d in each case show an embodiment of a scanning module according to the invention.
Figure 1B:
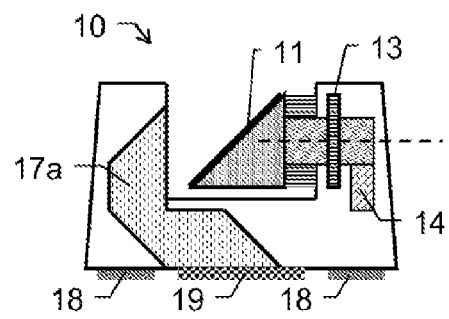

FIGS. 1a to 1d in each case show an embodiment of a scanning module 10 according to the invention or of an attachment scanner which can be mounted by means of a fixing apparatus 18 on a pivoting apparatus, e.g. a theodolite or a total station, and can thus extend this apparatus by a scanning functionality.

In a first embodiment (FIG. 1a), the attachment scanner 10 has a mirror 11 as a deflection element, which mirror can be rotated about a horizontal axis 12, wherein the rotation can be brought about by a motor 14 and a rotation angle can be acquired by means of an angle measuring sensor 13. In addition, the module 10 is equipped with a laser module 15, in particular with a beam source such as, for example, a laser diode for emitting a laser beam and with an and receiving unit for detecting reflected laser radiation. The emitted laser beam can be aligned via an optical beam guiding element 17 onto the mirror 11 and from there onto a measurement point. Furthermore, the attachment scanner is equipped with a camera 16, the image field of which is likewise directed via the optical beam guiding element 17 onto the mirror 11 and from there in the direction of the measurement point.

In a second embodiment of the scanning module 10 according to the invention (FIG. 1b), the attachment scanner 10 has an optical beam guiding element 17a, by which a laser beam aligned (here: from below) onto the module 10 can be defected onto the mirror 11 and from there onto the measurement point. With this embodiment, a laser beam from an external source not provided in the scanning module 10 can be deflected by means of the components of the module 10 and can be used for scanning. Furthermore, by means of the mirror 11 received, reflected radiation can be guided onto a detector that is likewise provided externally. Consequently, the scanning module 10 can be embodied without its own laser module 15. It is once again possible for the rotation of the mirror 11 to be carried out by a motor 14 and the measurement of the respective rotation angles to be carried out by means of a goniometer 13. In addition, in this embodiment a locking apparatus 19 is provided, with which the scanning module 10 can be connected e.g. to a measuring device in suitable positioning or by means of which the coupling-in of the laser beam can be carried out exactly.

In the third embodiment (FIG. 1c), the attachment scanner 10 is equipped with an optical beam guiding element 17b, by means of which a laser beam aligned from below onto the module 10 can be deflected onto the mirror 11 and from there onto the measurement point. Here, the rotatable mirror 11 is arranged eccentrically with respect to a vertical pivoting axis 22 of a pivoting apparatus. In addition, the scanning module 10 once again has a motor 14 for driving the rotation and a goniometer 13 for determining the rotation angle of the mirror 11. Moreover, a beam passage unit 9 is shown, by means of which a laser beam can be coupled into and out of the scanning module 10. For this purpose, the beam passage unit 9 can be embodied with an optically transparent window, for example, through which the beam can be transmitted on account of the specific transmission properties.

Figure 1C:
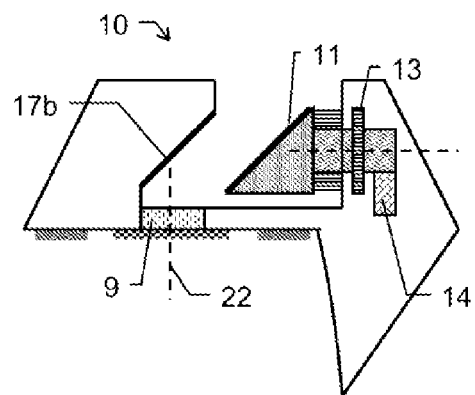
Figure 1D:
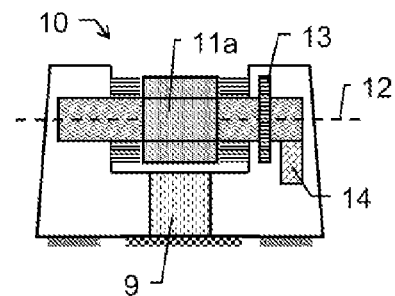

FIG. 1d shows a fourth embodiment of the scanning module 10, wherein a laser beam aligned from below onto the module 10 impinges directly on a polygon mirror 11a, which can be rotated about the rotation axis 12 by means of motor 14 and which deflects the beam. In this case, the beam is once again coupled into the scanning module by a beam passage unit 9. The laser beam can be generated by an external beam source and reflected radiation can be directed by means of the polygon mirror 11a onto a likewise external detector, which can be provided for example in a measuring device, as a result of which the scanning module 10 can be embodied without a laser module 15. In this embodiment, too, provision is made of an angle measuring functionality 13 for determining the rotation angles.

FIG. 2a shows a first embodiment of a measurement system 50 according to the invention, wherein a scanning module 10 is combined with a measuring instrument 20, e.g. a theodolite or total station. In this case, the scanning module 10 corresponds to a module 10 according to the invention as shown in FIG. 1a with mirror 11, goniometer 13, motor 14, rotation axis 12, laser module 15 and camera 16. In a scanning process, in this case the mirror 11 of the attachment scanner 10 can rotate about the horizontal axis 12 at high speed.

In this case, the entire upper part of the measuring device 20, the construction 20a designed for receiving the scanning module 10, can simultaneously be pivoted or rotated at lower speed about the vertical pivoting axis 22 relative to the base 20b of the measuring device 20. This can be brought about by a motor 26 arranged in the measuring instrument 20. During scanning, the laser module 15 can emit a laser beam 60 which is guided via an optical beam guiding element 17 onto the mirror 11 and from there e.g. onto the measurement point. By means of the laser beam 60, its reflection at a surface and the acquisition by the detector, it is thus possible to carry out a distance measurement to the measurement point on the surface. The coordinates of the measurement point can be calculated from the measured distance and also from the vertical angle or rotation angle acquired by the angle sensor 13 and a horizontal angle or pivoting angle determined by an angle sensor 24 arranged in the pivoting apparatus 20. In addition, the measuring instrument 20 has a targeting unit 30, in particular a telescope, said targeting unit being pivotable or rotatable about a second vertical axis 21. In this case, the targeting unit 30 can be pivoted by means of a further motor 25, wherein a further pivoting angle can be measured by an angle measuring sensor 23.

FIG. 2b shows a second embodiment of the measurement system 50 according to the invention with attachment scanner 10 and measuring device 20. In this case, the telescope 30 of the measuring instrument 20 can be aligned upward, substantially parallel to the vertical axis 22 thereof, and can be held or secured in this position by means of the locking apparatus 19. For scanning purposes, a laser beam 60 can be directed from the laser emitter 27 in the telescope 30 via an optical deflection element 29 in the telescope 30 onto an optical beam guiding element 17a in the attachment scanner 10 and from there onto the mirror 11 thereof and, if appropriate, furthermore subsequently onto the measurement point. In this case, the mirror 11 of the attachment scanner 10 rotates at high speed about the rotation axis 12. The construction 20a of the measuring device 20 can simultaneously pivot or rotate at lower speed about the vertical axis 22. In this case, too, the coordinates of the measurement point can be calculated from the measured distance and also from the rotation angle acquired by the angle sensor 13 and the pivoting angle determined by the angle sensor 24. For this purpose, the rotation angles, pivoting angles and distances for a respective measurement point are combined e.g. by means of a processing unit provided on the measurement system 50. During the scanning process, the image field of the camera 28 of the measuring instrument 20 can be aligned via the elements 17 or 29 and 17a and the mirror 11 onto the measurement point and image data can be acquired.

FIGS. 2c and 2d show a third and a fourth embodiment of the measurement system 50 according to the invention with respectively a measuring device 20 and a scanning module 10 corresponding to the embodiments in accordance with FIGS. 1c and 1d. Both embodiments of the measurement system 50 use a laser beam 60 which is emitted by a beam source 27, in particular laser diode, of the targeting unit 30 and is guided into the scanning module 10. A beam passage unit 9 is in each case provided for this purpose. Depending on the embodiment, the beam passage unit 9 can be designed for example as mirror protection or as means for enlarging the field of view of the camera 28. The beam 60 can be directed by means of a beam deflection element 17b onto the mirror 11 or onto the polygon mirror 11a and can be directed onto a surface to be measured. In FIG. 2c, the laser beam 60 is in this case emitted from the mirror 11 eccentrically with respect to the pivoting axis 22, wherein a laser plane lying parallel to the axis 22 can be generated.

The respective angles and the distance which are acquired at the same time or at defined time intervals that can be assigned to one another can be combined for a point measurement. In the embodiment in accordance with FIG. 2a, for example, this acquisition can be controlled by the measuring device by virtue of the fact that, at the time of measurement of the horizontal angle by the angle sensor 26, via a data interface, a trigger signal is sent to the attachment scanner 10, which triggers there the measurement of the vertical angle by the angle sensor 13 and of the distance. Moreover, at the time of measurement of the vertical angle and of the distance, the attachment scanner 10 can send a trigger signal to the measuring instrument and initiate there a simultaneous triggering or a triggering within a specific time period of the horizontal angle measurement. Furthermore, the trigger signal can be sent continuously e.g. upon each point measurement or at specific angle positions e.g. once per revolution of the mirror 11, in particular in the nadir position thereof. In particular, the measurement data can be interpolated between the trigger signals.

The measurement data (vertical angle and/or distance) determined by the scanning module 10 can be communicated via a data interface to the measuring device 20, where they can be stored together with a horizontal angle determined by the measuring device 20. In particular, in a control and processing unit of the measuring device 20, point coordinates can be calculated from the angles and the distance and said point coordinates can be stored.

In addition, it is also conceivable to communicate the horizontal angle from the measuring device 20 to the attachment scanner 10, where said horizontal angle can be stored together with the vertical angle and the distance on a storage module or point coordinates can be calculated therefrom by means of a corresponding control and processing unit of the attachment scanner 10. If the horizontal angle is acquired and transmitted e.g. at a lower measurement rate, the measured angles can be interpolated in the processing unit, such that only a comparatively small number of angle values need be transmitted from the measuring device 20 to the attachment scanner 10, e.g. only one value per vertical revolution of the mirror 11 or polygon mirror 11a. Furthermore, a compression, e.g. by filtering, of the measurement data or point coordinates can be effected before the data transmission or storage. A very efficient data compression is possible with an angle triggering, wherein the angle sensor of the fast axis represents the trigger source. In this case, it suffices to store only the sequence of the distance measurement values with the fewer measurement angles of the slow axis 22. The point positions and the point cloud associated therewith can be generated from such a greatly reduced sequence of measurement values.

Furthermore, it is possible to communicate the horizontal angle from the measuring device 20 and also the vertical angle and the distance from the attachment scanner 10 to an external processing unit, e.g. to a mobile remote control situated neither in the measuring device 20 nor in the attachment scanner 10.

The communication between measuring instrument 20, attachment scanner 10 and e.g. a controller can be effected via a wire connection, via radio (e.g. Bluetooth or WLAN) and/or via an optical, inductive or capacitive interface. For this purpose, suitable transmitting and receiving units can be provided at the individual components of the measurement system 50 according to the invention. The energy supply of the attachment scanner 10 can furthermore be effected by an integrated battery or by from the measuring device 20 by means of electrical contact-making.

In order to ensure a high accuracy for a coordinate measurement by means of the scanning module 10, an external orientation of the scanning module 10 can be determined. For this purpose, it is possible to mount the scanning module 10 at a defined position (whereby three translation parameters are known) and in a defined alignment (whereby three rotation parameters are known) on the measuring device 20. The measuring device 20 can furthermore be calibrated into a measurement environment, in particular by the targeting of target points with known coordinates, as a result of which the position and alignment of the measuring device 20 are known. In addition, a deviation from the defined position and/or alignment can be acquired by sensors and taken into account in e.g. the calculation of the coordinates of the measurement points. In this case, mounting in a defined position and/or alignment can be realized for example by means of a mechanical fixing or centering device, whereby a high positional accuracy can be made possible.

In addition to the scanning process by means of the scanning module 10, at the same time a "scanning" can also be effected by means of the measuring device 20. In this case, the telescope 30 can rotate at comparatively low speed about the horizontal axis 21. In this case, the horizontal angle can be measured by the angle sensor 24 and the vertical angle by the angle sensor 23—the distance can be determined by means of the laser module 27. From these measurement data it is possible to calculate the coordinates of measurement points, which can form a point cloud in total.

After the scanning, therefore, two point clouds can be present. A first point cloud having high resolution but low accuracy, which was acquired by the scanning module 10, and a second point cloud having lower resolution but high accuracy, which was generated by the measuring device 20. By means of a matching of the two point clouds, it is thus possible to detect or correct systematic faults e.g. of the scanning module 10.

If the attachment scanner 10 does not have its own camera, the image capture can be carried out by a camera 28 provided on the measuring device 20. For this purpose, during a scanning process carried out by means of the attachment scanner 10, the telescope 30 of the measuring device 20 can pivot or rotate at lower speed about the horizontal axis 21 thereof. With the camera incorporated in the telescope 30 (on-axis camera, i.e. the camera 28 acquires an image corresponding to the alignment of the laser beam 60, in particular coaxially), images can be captured and, at the same time, the horizontal angle and the vertical angle of the telescope 30 can be acquired. By means of these angles, given a known position and alignment of the attachment scanner 10, the image data can be combined with the scanning data. Furthermore the measurement system 50 can be equipped with an overview camera, wherein the overview camera has a larger field of view in comparison with the camera 28 and can thus acquire a larger region of a measurement environment. The outputting of the images thus acquired can offer a user, in particular, an additional benefit with regard to the orientation and targeting of targets in the terrain.

Figure 3:
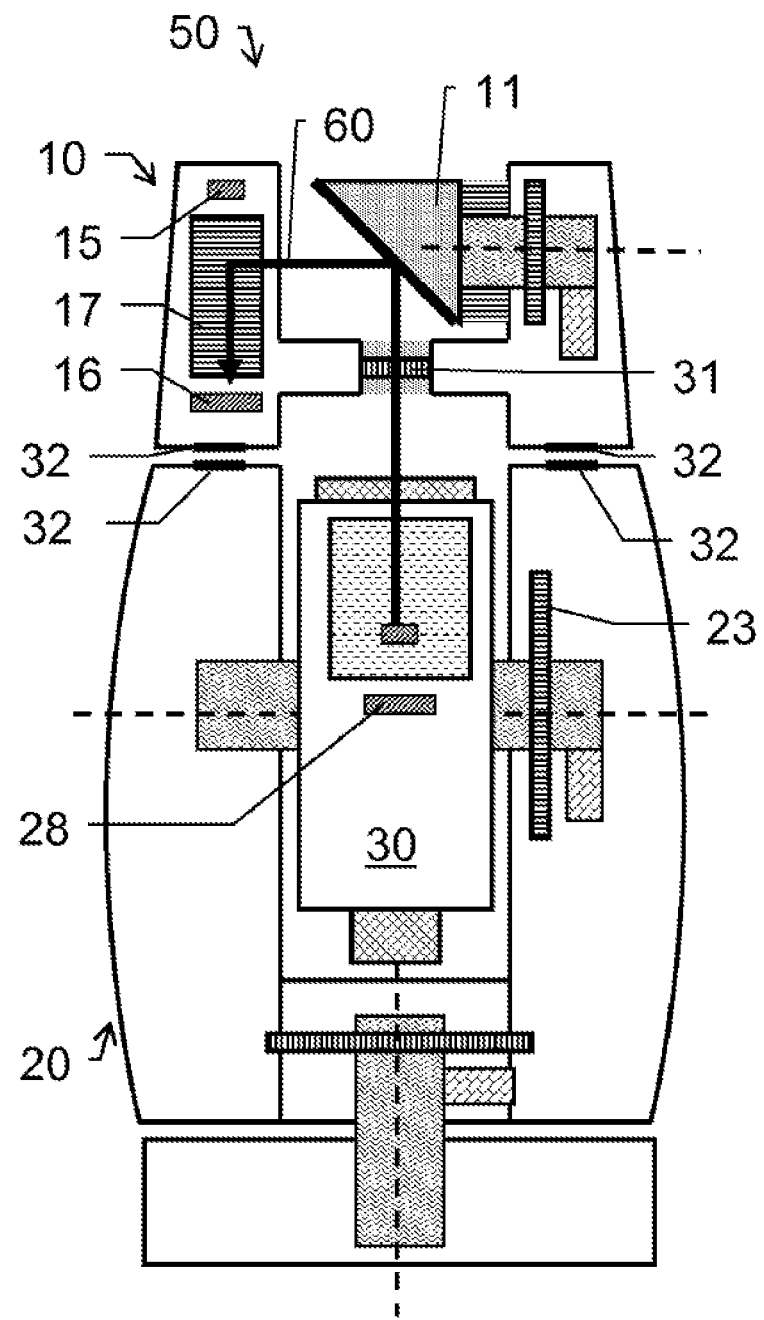
FIG. 3 shows a further embodiment of a measurement system according to the invention with measuring device and scanning module with distance sensors and a laser beam directed onto a detector.

FIG. 3 shows a measuring device 20 with scanning module 10 in accordance with the embodiment in FIG. 2a, wherein the attachment scanner 10 is equipped with an additional optical element 31, e.g. lens or filter, in order to ensure an optical imaging suitable for determining a position of a laser point on the camera 16. Distance measuring sensors 32 for determining position and alignment parameters are additionally provided. If the distance between the attachment scanner 10 and the measuring device 20 is acquired at at least three different positions (which do not lie on a straight line) by means of such sensors 32, a vertical distance and also the longitudinal and transverse inclinations of the scanning module 10 can be derived from these measurements.

Additional parameters can be determined by virtue of the fact that the laser beam 60 is directed from the measuring device 20 via the mirror 11 and the beam guiding element 17 onto the camera 16, which can have a position-sensitive sensor, of the scanning module 10. For this purpose, the telescope 30 of the measuring device is aligned upward parallel to the vertical axis and the mirror 11 of the attachment scanner 10 is aligned downward. The parameters can be derived from an acquired position of the laser point in a captured image of the position-sensitive sensor. Conversely, the laser beam 60 can also be imaged from the laser module 15 of the attachment scanner 10 onto the camera sensor 28 of the measuring device 20 and offset parameters and angle parameters can be derived from this position of the laser point. For this purpose, the camera sensor 28 can likewise be embodied and evaluated position-sensitively.

In particular—e.g. in the case of a coarse alignment of the telescope 30 parallel to the vertical axis 22—in the case of an approximate alignment the angle deviation can be acquired by means of the angle sensor 23 and taken into account for example in a coordinate calculation. In addition, calibration parameters of the measuring instrument 20 (e.g. corrections of the target line error and/or tilting axis error) and of the attachment scanner 10 can concomitantly influence the calculation.

In addition, the attachment scanner 10 can be equipped with an inclination sensor that acquires the inclination in longitudinal and transverse directions in relation to the gravitational field. Said sensor can be used to correct the measurements of the attachment scanner with regard to the deviation of the pivoting axis (vertical axis) from a perpendicular direction.

Furthermore, a relative inclination of the attachment scanner 10 in relation to the measuring device 20 can be calculated from the difference between the measured inclinations of the attachment scanner 10 and an inclination determined by an inclination sensor of the measuring device 20.

A horizontal pivoting of the attachment scanner 10 in relation to the measuring device 20 can additionally be effected by the scanning of a prominent structure, for example a vertical house edge, by the attachment scanner 10, on the one hand, and by the measuring device 20, on the other hand, wherein the difference angle can be determined on the basis of a horizontal offset of the two point clouds that can be obtained in this case.

The attachment scanner 10 can furthermore be equipped with a storage module, such that the acquired measurement data can be stored directly in the attachment scanner. In parallel therewith, the measurement data of the measuring device 20 can be stored on a memory arranged there. The synchronization of the attachment scanner 10 and of the measuring device 20 can be effected by means of a trigger signal communicated from the measuring device 20 to the attachment scanner 20 (or vice versa). In this case, the synchronization can be effected on the basis of a time signal respectively received by the measuring device 20 and the attachment scanner 10, wherein a time receiver is respectively assigned to the two components. In particular, the synchronization can also be effected by two GPS receivers which each receive the GPS time, a respective GPS receiver being arranged on the measuring device 20 and attachment scanner 20. The acquired time signals can in each case be combined with measurement values (by way of example, a time stamp can be assigned to the measurement data) and a subsequent assignment of the measurement values can be effected by means of the combination.

Figure 4:
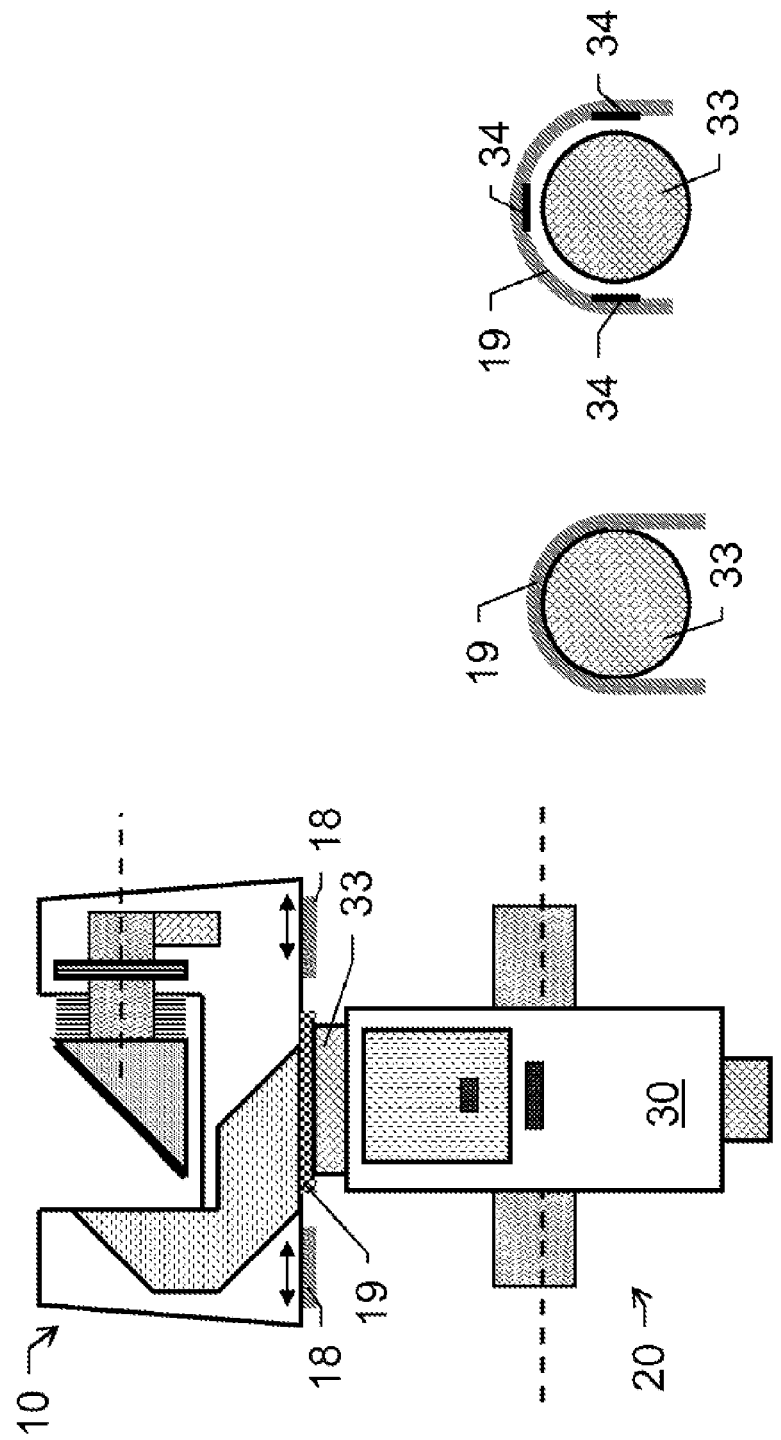
FIGS. 4a-c show a further embodiment of a measurement system according to the invention with a centering apparatus.

FIG. 4a shows a scanning module 10 with a measuring instrument 20, wherein a mechanical locking or centering of the two components is additionally shown, in particular in joint consideration with FIGS. 4b and 4c. In this case, the beam exit end 33, in particular the objective lens, of the telescope 30 is received in its illustrated alignment by the locking apparatus 19 in such a way that a lateral displacement which is caused thereby and which is made possible by the suitable embodiment of the fixing apparatuses 18 brings about a centering of the attachment scanner 10 relative to the measuring instrument 20. In particular, FIG. 4c illustrates a locking apparatus 19 in which the attachment scanner 10 is locked with a coarse positioning relative to the beam exit end 33 and a remaining offset with respect to a desired position can be acquired by means of distance sensors 34 and taken into account computationally in the coordination determination for the measurement point.

Figure 5:
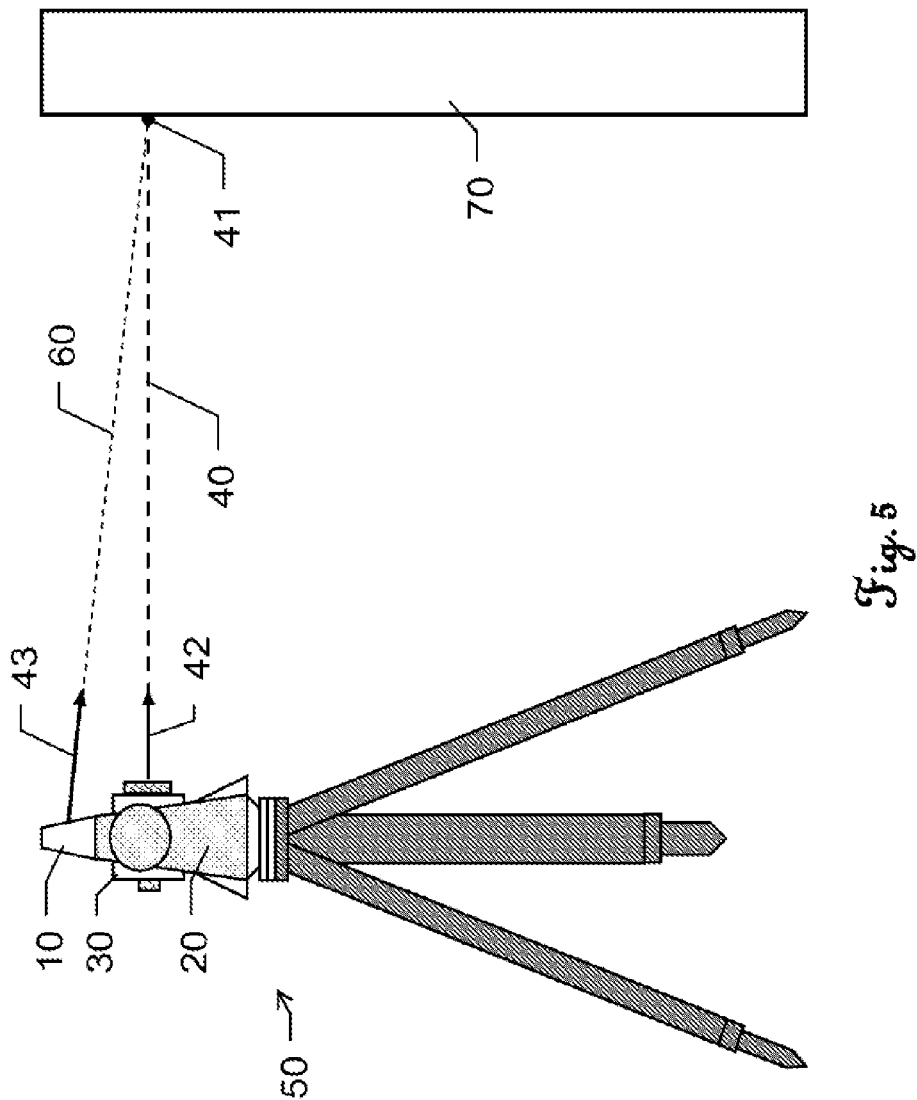
FIG. 5 shows a measuring process with a measurement system according to the invention for calibration.

FIG. 5 shows a measuring process with a measurement system 50 according to the invention, in particular for calibrating the system 50. During the calibration, it is possible to determine parameters which describe e.g. mechanical deviations from a desired geometry and are used for calculating compensations or corrections of the measurement values. Internal calibration parameters such as e.g. the angle of the mirror 11 in relation to the rotation axis 12 thereof or the impingement angle of the laser beam 60 on the mirror 11 can generally be determined after the manufacture of the scanning module 10. These parameters can be checked after relatively long time periods of use of the device by means of corresponding methods and can be corrected, if appropriate, in order to be able to ensure a high precision of the system 50. Furthermore, the measurements described below can also serve to determine an external orientation of the attachment module 10 in relation to the measuring device 20, in particular in combination with measurement by additional sensors.

For calibration purposes, measurements are carried out which can be used to determine the calibration parameters—usually by means of a compensation calculation. For this purpose, e.g. the measuring device 20 can be aligned with a target point 41 on an object 70 at a known distance. From the known distance and also from the angles acquired by the angle sensors and 24, it is possible to determine a reference target direction 42 in the coordinate system of the measuring device 20. At the same time, the mirror 11 can be aligned with the point 41 marked by a laser beam 40 in such a way that said point is imaged as a laser point in the image of the camera 16 of the scanning module 10. A direction 43 can be determined by measurements by means of the angle sensors 13 and 24 and the determination of the position of the laser point 41 in the captured camera image. The calibration parameters can be determined by a matching of the reference directions 42 and the directions 43 with a plurality of points, wherein the number and the spatial distribution of the point positions to be determined are dependent on the parameters to be determined.

Measurements onto the same point 41 in two circle positions are particularly advantageous, that is to say that after the point has been measured in the first circle position, the measuring device 20 with the attachment scanner 10 is rotated horizontally by 180° and then the telescope 30 of the measuring device 20 and the mirror 11 of the attachment scanner 10 are rotated vertically in such a way that the same point 41 can be measured in the second circle position.

The method can also be carried out oppositely, by virtue of the laser beam 60 of the attachment scanner 10 marking a point 41 and the latter being acquired by the camera 28 in the measuring device 20.

If the distance to the point is not known, a distance measurement can be carried out by means of the laser module 27. From the distance and the angles determined by the angle sensors 23 and 24, it is possible to determine the coordinates of said point 41 in the coordinate system of the measuring device 20. From these coordinates, it is possible to derive a reference target direction 43 for the attachment scanner 10.

If neither measuring device 20 nor attachment scanner 10 has a camera, the measurements required for the calibration can be carried out manually in a modified form. For this purpose, the laser beam 60 of the attachment scanner 10 can be aligned with a significant point 41, e.g. a target mark. In this case, the angles are measured by the angle sensors 13 and 24 and the direction 43 is thus determined. By means of the rotation of the measuring device 20 about the vertical axis 22 and by means of the rotation of the telescope 30 about the horizontal axis 21, the laser beam 40 of the measuring device 20 is aligned with exactly the same point and the angles are measured by the angle sensors 23 and 24 and the reference direction 42 is derived therefrom. The telescope 30 can be aligned by the laser beam 40 being made to coincide with the significant point 41, e.g. the target mark, or by conventional targeting by means of a reticle. Calibration parameters which relate to the distance measurement of the attachment scanner 10, e.g. distance offset and/or distance scaling, can be determined on the basis of measurements of the distance to identical points at different distances by means of the measuring device 20 and the attachment scanner 10.

Figure 6A:
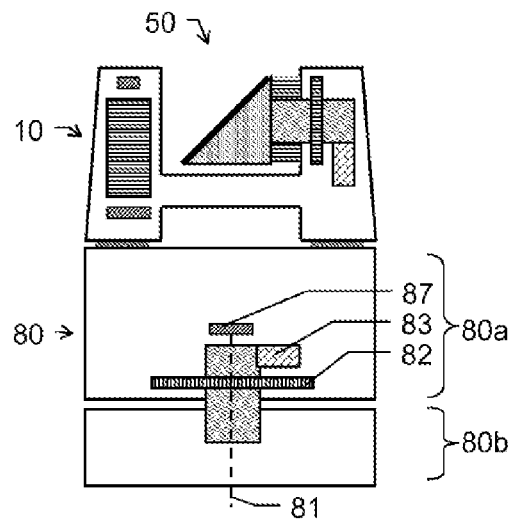
FIGS. 6a-b in each case show a further embodiment of a measurement system according to the invention with a pivoting apparatus and a scanning module.

In particular, the scanning module 10 can furthermore be pivoted or rotated by means of a motorized pivoting apparatus 80. In this respect, FIGS. 6a and 6b in each case show a further embodiment of a measurement system 50 according to the invention with a pivoting apparatus 80 and a scanning module 10. FIG. 6a illustrates an attachment scanner 10 with a first embodiment of a pivoting apparatus 80. The apparatus 80 has a lower base 80b and an upper construction 80a, which is pivotable about the vertical axis 81, wherein the pivoting can be effected by a motor 83 and the pivoting angle can be acquired by an angle sensor 82.

Figure 6B:
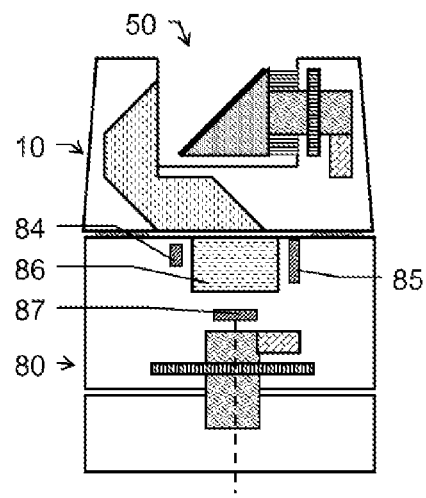

A second embodiment of the motorized pivoting apparatus 80 is shown in FIG. 6b. The latter is additionally equipped with a laser module 84, a camera 85 and an optical deflection element 86. A scanning process with these two embodiments can be carried out analogously to the embodiments in accordance with FIGS. 2a and 2b. Both embodiments can additionally be equipped with an, in particular two-dimensional, inclination sensor 87, a magnetic compass, a display, in particular a touch-sensitive display, and/or a detachable operating element.

Figure 7:
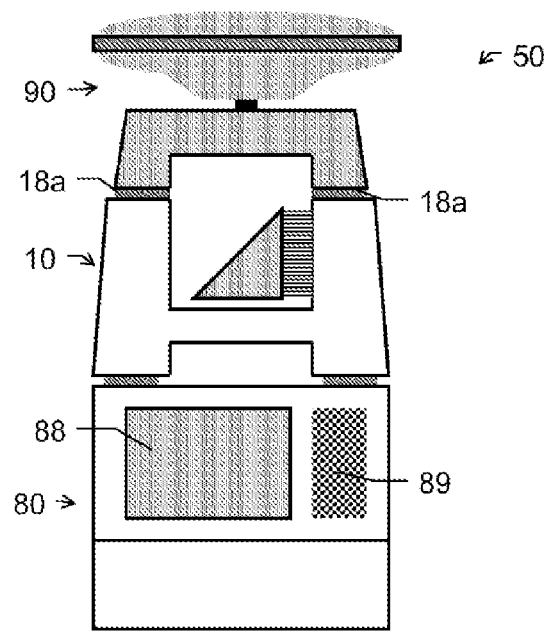
FIG. 7 shows a further embodiment of a measurement system according to the invention with pivoting apparatus, scanning module and an attached GNSS module.

FIG. 7 shows a further embodiment of a measurement system 50 according to the invention with pivoting apparatus 80, scanning module 10 and an attached GNSS unit or GNSS antenna 90. For this purpose, the attachment scanner 10 can be equipped with fixing apparatuses 18a for mounting the GNSS antenna 90. In addition, the pivoting apparatus 80 has a display 88 for displaying information and an operating panel 89, in particular for inputting control commands.

It goes without saying that these illustrated figures merely illustrate possible exemplary embodiments schematically. The different approaches can likewise be combined according to the invention with one another and also with systems and methods for measuring surfaces or objects and with measuring devices from the prior art.

What is claimed is:

1. A measurement system comprising
a measuring device, comprising
   a base,
   a construction arranged on the base and pivotable about a pivoting axis,
   a targeting unit, wherein the targeting unit has at least
      an emission unit for emitting a first laser beam, said emission unit defining an optical target axis, and
      a first distance meter for measuring a distance to an object, and
      a first angle sensor for highly precisely acquiring at least one pivoting angle defined by a relative pivoting position of the construction with respect to the base,
   a control and processing unit for data processing and for control of the measurement system,
wherein
the measurement system has a scanning module comprising
   a fixing apparatus for fixing the scanning module to a receptacle corresponding to the fixing apparatus,
   a beam deflection element for deflecting a scanning laser beam, said beam deflection element being rotatable about a rotation axis in a motorized fashion, wherein the rotation axis in a received state is at a defined angle relative to the pivoting axis, and
   a second angle sensor for determining a rotation angle from an angular position of the beam deflection element,
the measuring device has a receptacle embodied in such a way that the scanning module can be fixed in a modular manner in a defined positioning on the measuring device as a result of an interaction of the receptacle with the fixing apparatus,
the control and processing unit is embodied in such a way that
   the respective rotation angle, the respective pivoting angle and the respective distance for a point on the object are combined, such that a respective point position is defined by the combination, and
   a point cloud having a number of the point positions can be generated.

2. The measurement system as claimed in claim 1, wherein
the scanning module has a beam passage unit, and the targeting unit can be aligned in such a way that the first laser beam can be coupled into the scanning module by means of the beam passage unit in a coupling-in state and can be deflected in a rotating fashion as a scanning laser beam about the rotation axis by means of the beam deflection element, wherein a scanning laser beam reflected at the object can be coupled out from the scanning module by means of the beam passage unit.

3. The measurement system as claimed in claim 2, wherein the scanning module has an acquisition unit embodied in such a way that an impingement position of the first laser beam, which can be deflected onto the acquisition unit by means of the beam deflection element in the coupling-in state, on the acquisition unit can be acquired, wherein a positioning parameter indicating a relative positioning of the scanning module with respect to the measuring device can be generated depending on the impingement position, wherein the point positions can be corrected by means of the positioning parameter.

4. The measurement system as claimed in claims 1, wherein
the scanning module has a beam source for emitting a second laser beam as a scanning laser beam, and the scanning laser beam can be deflected in a rotating fashion about the rotation axis by means of the beam deflection element, wherein the scanning module has a second distance meter for distance measurement by means of the scanning laser beam.

5. The measurement system as claimed in claim 1, wherein
the measurement system has an at least two-component centering apparatus for the defined positioning of the scanning module on the measuring device, wherein a first component is assigned to the scanning module and a second component is assigned to the measuring device, wherein a positioning accuracy can be measured by means of sensors for determining a relative positioning of the first component with respect to the second component.

6. The measurement system as claimed in claim 1, wherein
the measurement system has at least one distance measuring sensor for measuring a distance between the scanning module and the measuring device in the received state for generating a further positioning parameter indicating the relative positioning of the scanning module with respect to the measuring device, and/or
the measurement system has a camera for acquiring an image.

7. The measurement system as claimed in claim 1, wherein an inclination of the scanning module relative to the measuring device can be determined by means of scanning of a prominent structure, wherein the inclination is determined depending on a comparison of a scanning point cloud representing the prominent structure and generated by means of the scanning module and a measurement point cloud representing the prominent structure and generated by means of the measuring device.

8. A scanning module for a measurement system as claimed in claim 1, comprising
   a beam deflection element for deflecting a scanning laser beam, said beam deflection element being rotatable about a rotation axis in a motorized fashion,
   an angle sensor for determining a rotation angle from an angular position of the beam deflection element,
wherein
   the scanning module has a fixing apparatus for fixing the scanning module to a receptacle corresponding to the fixing apparatus, wherein the scanning module can be fixed in a modular manner in a defined positioning on the measuring device as a result of an interaction of the fixing apparatus with the receptacle arranged on a measuring device, and
   the scanning module is designed for transferring the rotation angle to a control and processing unit in accordance with the measurement system as claimed in claim 1.

9. The scanning module as claimed in claim 8, wherein
the scanning module has a beam passage unit for coupling in and/or coupling out the scanning laser beam, such that at least the coupled-in scanning laser beam can be deflected in a rotating manner about the rotation axis by means of the beam deflection element.

10. The scanning module as claimed in claim 8, wherein the scanning module has a beam source for emitting the scanning laser beam, and the scanning laser beam can be deflected in a rotating manner about the rotation axis by means of the beam deflection element, and/or
the scanning module has an acquisition unit for acquiring the scanning laser beam, wherein the acquisition unit has a distance meter for measuring distance with respect to an object and/or a position-sensitive sensor for determining an impingement position of the scanning laser beam on a sensor.

11. The scanning module as claimed in claim 8, wherein the scanning module has a data interface embodied in such a way that information is transmitted from the scanning module to the measuring device, connected to the scanning module by means of the fixing apparatus, wherein the information can be transmitted between scanning module and device.

12. The scanning module as claimed in claim 11, wherein the information comprises angle information and/or distance information.

13. The scanning module as claimed in claim 1, wherein the scanning module has a control and processing unit for data processing and for controlling the alignment of the beam deflection element, wherein the control and processing unit is designed in such a way that, after obtaining pivoting angle information generated by the measuring device and distance information indicating the distance to an object,
the respective rotation angle, the respective pivoting angle and the respective distance for a point on the object are combined, such that a respective point position on the object is defined by the combination, and
a point cloud having a number of the point positions can be generated.

14. The measurement system as claimed in claim 1, wherein the targeting unit comprises a telescopic sight.

15. The measurement system as claimed in claim 1, wherein the measuring device comprises at least one of a total station, theodolite or laser tracker.

16. A measuring device for a measurement system comprising:
a base,
a construction arranged on the base and pivotable about a pivoting axis,
a targeting unit, wherein the targeting unit has at least
an emission unit for emitting a laser beam, said emission unit defining an optical target axis, and
a distance meter for measuring a first distance to an object, and
an angle sensor for highly precisely acquiring at least one pivoting angle defined by a relative pivoting position of the construction with respect to the base,
wherein
the measuring device furthermore has
a receptacle embodied in such a way that a scanning module can be fixed in a modular manner in a defined positioning on the measuring device as a result of an interaction of the receptacle with a fixing apparatus of the scanning module,
a data interface embodied in such a way that information is obtained from the scanning module, and
a control and processing unit for data processing and for controlling the measuring device, wherein the control and processing unit is embodied in such a way that, after obtaining rotation angle information generated by the scanning module and distance information indicating a second distance to the object,
the respective rotation angle, the respective pivoting angle and the respective first or second distance for a point on the object are combined, such that a respective point position on the object is defined by the combination, and
a point cloud having a number of the point positions can be generated.

17. The measuring device according to claim 16, wherein the measuring device comprises at least one of a total station, theodolite or laser tracker.

18. The measuring device according to claim 16, wherein the information comprises angle information and/or distance information.

19. A computer program product comprising program code, stored on a machine-readable carrier, for controlling or carrying out the scanning method for generating a point cloud as claimed in claim 14.

* * * * *